(12) United States Patent
Elyada et al.

(10) Patent No.: US 9,035,880 B2
(45) Date of Patent: May 19, 2015

(54) CONTROLLING IMAGES AT HAND-HELD DEVICES

(75) Inventors: Oded Elyada, Kfar Saba (IL); Guy Asi Merin, Einhod (IL); Karen Rachel Master Ben-Dor, Kafar Sava (IL); Adi Diamant, Shoham (IL); Xuedong D Huang, Bellvue, WA (US); Inbal Ort Bengal, Aseret (IL)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 13/409,495

(22) Filed: Mar. 1, 2012

(65) Prior Publication Data

US 2013/0229330 A1    Sep. 5, 2013

(51) Int. Cl.
| | |
|---|---|
| G06F 3/033 | (2013.01) |
| G09G 5/08 | (2006.01) |
| G06F 3/03 | (2006.01) |
| G06F 3/0487 | (2013.01) |
| G06F 9/44 | (2006.01) |
| G09G 3/00 | (2006.01) |
| G09G 5/00 | (2006.01) |
| G06F 3/0346 | (2013.01) |

(52) U.S. Cl.
CPC .. G09G 5/00 (2013.01); G06F 3/03 (2013.01); G06F 3/0346 (2013.01); G06F 3/0487 (2013.01); G06F 9/4443 (2013.01); G09G 3/003 (2013.01); G09G 2320/0261 (2013.01); G09G 2340/12 (2013.01); G09G 2340/14 (2013.01)

(58) Field of Classification Search
CPC .............................. G06F 3/0346; G06F 3/0334
USPC ............ 345/158, 173, 419; 455/566; 715/863
See application file for complete search history.

(56) References Cited

U.S. PATENT DOCUMENTS

| | | | |
|---|---|---|---|
| 8,019,390 B2* | 9/2011 | Sindhu | .......................... 455/566 |
| 2008/0215428 A1 | 9/2008 | Ramer et al. | |
| 2008/0284738 A1 | 11/2008 | Hovden et al. | |
| 2009/0219166 A1 | 9/2009 | MacFarlane et al. | |
| 2010/0123737 A1 | 5/2010 | Williamson et al. | |
| 2010/0138285 A1 | 6/2010 | Leonard et al. | |

(Continued)

OTHER PUBLICATIONS

"Interactive Advertising Bureau Mobile Rich-media Ad Interface Definitions (MRAID) v.1.0", Published on: Oct. 20, 2011, Available at: http://www.iab.net/media/file/IAB_MRAID_VersionOne_final.pdf.

(Continued)

*Primary Examiner* — Ricardo L Osorio
(74) *Attorney, Agent, or Firm* — Steve Wight; Judy Yee; Micky Minhas

(57) ABSTRACT

Controlling images at hand-held devices using sensor input, for example, as detected by one or more orientation sensors in a hand-held computing device is described. In various embodiments images are displayed at a hand-held computing device according to orientation sensor readings observed at the device and before user input is received at the images. For example, two or more images with different opacities are superimposed and the opacities differentially varied as the hand-held device is tilted. In another example images are placed in a 3D space which is rotated as the device is tilted. In another example, a video is played either forwards or backwards according to an orientation of the device. In various examples the images are displayed as part of a web page by using a template in the web page to control the display of images according to sensor readings.

20 Claims, 6 Drawing Sheets

(56) References Cited

U.S. PATENT DOCUMENTS

| | | | |
|---|---|---|---|
| 2010/0141571 A1 | 6/2010 | Chiang et al. | |
| 2011/0032268 A1 | 2/2011 | Takei | |
| 2011/0169823 A1 | 7/2011 | Barenburg et al. | |
| 2011/0176720 A1 | 7/2011 | Van Osten et al. | |
| 2011/0213664 A1 | 9/2011 | Osterhout et al. | |
| 2011/0261048 A1* | 10/2011 | Lee et al. | 345/419 |
| 2012/0036485 A1* | 2/2012 | Watkins et al. | 715/863 |
| 2012/0268391 A1* | 10/2012 | Somers | 345/173 |
| 2013/0201303 A1* | 8/2013 | Shimotani et al. | 348/51 |

OTHER PUBLICATIONS

"Uncover Your World with AdMob Rich Media and the Google Search App", Published on: Aug. 26, 2011, Available at: http://googlemobileads.blogspot.com/2011/08/uncover-your-world-with-admob-rich.html.

Nasiri, et al., "Motion Processing: The Next Breakthrough Function in Handsets", In Proceedings of InvenSense Inc., Jul. 2009, 10 pages.

"Yahoo! Living Ads: Where Motion and Emotion Meet", Retrieved on: Dec. 13, 2011, Available at: http://advertising.yahoo.com/blogs/events-blog/yahoo-living-ads-where-motion-emotion-meet-02482049.html.

Wong, Dan, "The Emerging Trend: Smartphone Ad and In-App Ad", Retrieved on: Dec. 13, 2011, Available at: http://www.slideshare.net/Madhouse/the-emerging-trend-smartphone-ad-and-in-app-ad.

Elyada, et al., "Controlling Images at Mobile Devices Using Sensors", New US Patent Application filed Today.

* cited by examiner

US 9,035,880 B2

CONTROLLING IMAGES AT HAND-HELD DEVICES

BACKGROUND

Hand-held computing devices such as mobile telephones, tablets, slates, personal digital assistants, games consoles, remote control devices and others are widely available and increasingly used for many purposes.

For many applications images are to be presented at displays integral with the hand-held device where those images are obtained from other entities in a communications network such as web servers and other entities. Control of the images at the hand-held devices has involved static display of the images for various purposes such as advertising, provision of a user interface and other purposes. The available display area is limited as the devices are hand-held and this limit on space has constrained the control of images at such hand-held devices.

The embodiments described below are not limited to implementations which solve any or all of the disadvantages of known processes for controlling images at hand-held devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Controlling images at hand-held devices using sensor-signals, for example, as detected by one or more sensors in a hand-held computing device, is described. In various embodiments images are displayed at a hand-held computing device according to sensor readings observed at the device and before user input is received at the images. For example, two or more images with different opacities are superimposed and the opacities differentially varied as the hand-held device is tilted. In another example images are placed in a 3D space which is rotated as the device is tilted. In another example, a video is played either forwards or backwards according to an orientation of the device. In various examples the images are displayed as part of a web page by using a template in the web page to control the display of images according to sensor readings.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an information retrieval system, the systems described are provided as an example and not a limitation. As those skilled in the art will appreciate, the present examples are suitable for application in a variety of different types of systems for sensor-based control of images at hand-held computing devices.

Figure 1:
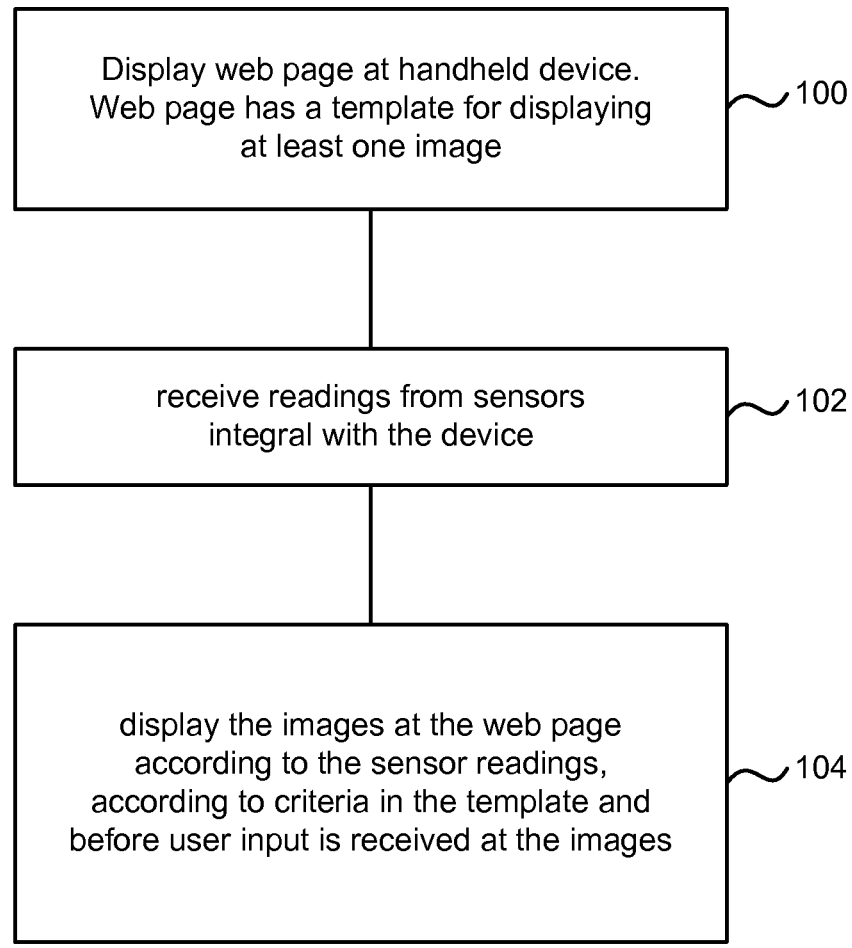
FIG. 1 is a flow diagram of a method of controlling images at a hand-held computing device.

FIG. 1 is a flow diagram of a method of controlling images at a hand-held computing device such as a hand-held telephone, slate computer, tablet computer, personal digital assistant or other computing device which may be easily moved. The computing device has one or more sensors for providing information about the environment of the device or its internal status. For example, orientation of the device is sensed and a non-exhaustive list of examples of sensors is: accelerometer, compass, gyroscope, camera, light sensor, pressure sensor, GPS, magnetometer, microphone. The computing device has a web browser of any suitable type for accessing and displaying web pages and content including images from the internet, an intranet or other communications network. In some examples the images may comprise video although that is not essential.

The method comprises displaying 100 a web page at the hand-held computing device where the web page comprises a template for displaying at least one image. The template comprises an identifier of each image to be displayed such as an address or link to a location from which the image may be accessed. The template also comprises one or more criteria (such as rules, thresholds or other criteria) as described in more detail below and instructions about how to display the image or images at the device according to the criteria.

Readings are received 102 from one or more sensors integral with the hand-held computing device. The sensor readings may be smoothed and/or filtered to remove noise. The image or images are then displayed 104 at the web page according to the sensor readings, according to criteria in the template and before user input is received at the image or images. User input is received at an image displayed at the hand-held computing device when a user touches the image (where a touch-sensitive interface is provided) and/or where a user clicks on or hovers a cursor on the image.

Figure 2:
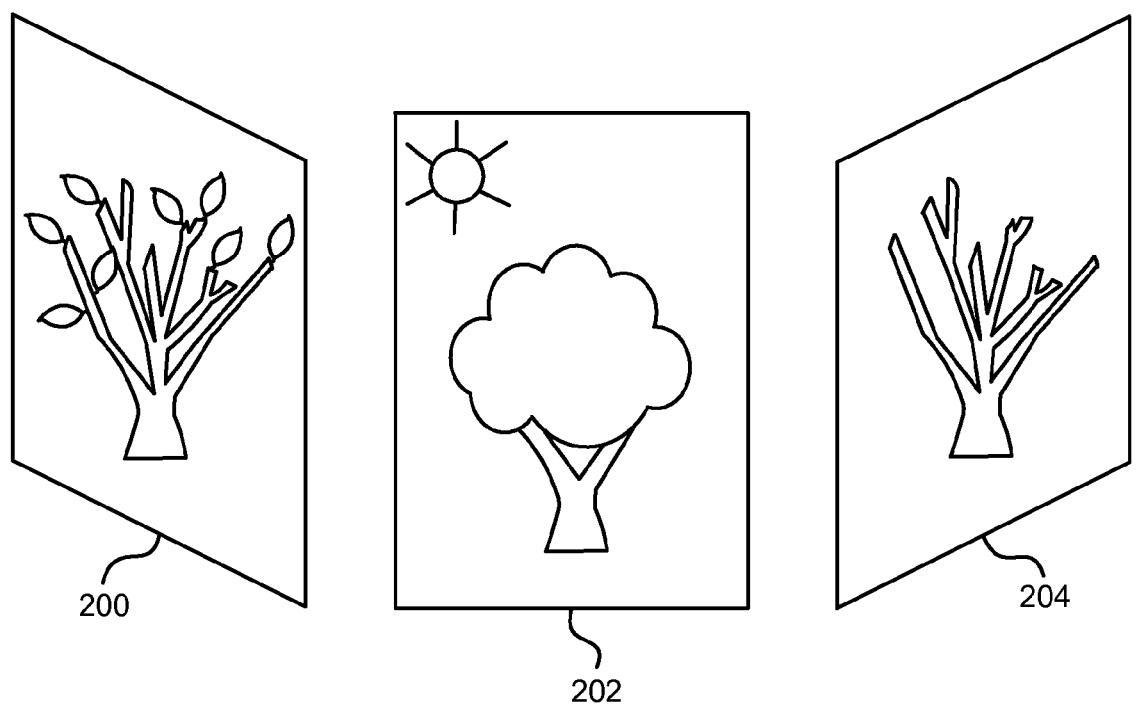
FIG. 2 shows a slate computing device in three different orientations tilted about a longitudinal axis of the device.

FIG. 2 shows three views of a slate computer 200, 202, 204. The computer may display a search engine web page at a display screen. In the example illustrated schematically in FIG. 2 a search engine web page with an image depicting a tree is displayed (the search engine query entry box is not shown for clarity). As the slate computer is tilted about an axis of the device the image of the tree transitions between an image of the tree in different seasons of the year (here spring, summer and winter are shown but these are examples only). In this way a user is able to change the orientation of the slate computer in order to view images of the tree in different seasons.

Figure 3:
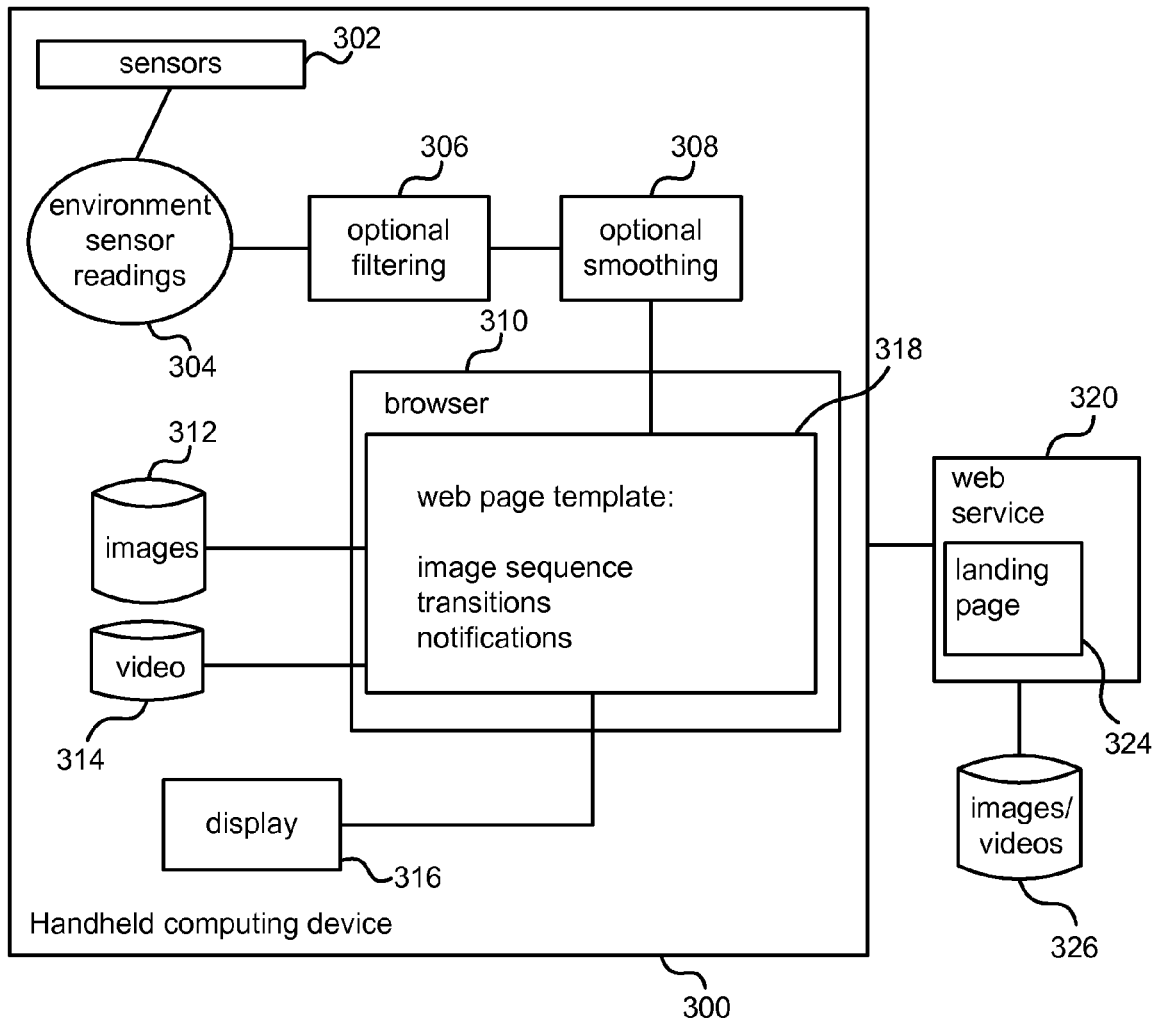
FIG. 3 is a schematic diagram of a hand-held computing device.

FIG. 3 is a schematic diagram of a hand-held computing device 300 showing functionality used in the examples described herein. Other components and parts of the hand-held computing device are not shown to aid clarity but are available to enable operation of the device as a hand-held computing device such as a hand-held telephone, slate computer or similar.

The device comprises at least one sensor 302 which may be any combination of one or more of: an accelerometer, a compass, a gyroscope, a camera, a GPS, a microphone, a light meter, a pressure meter, a magnetometer or other sensor. Sensor readings 304 are captured and optionally filtered 306 to remove noise. The Sensor readings 304 are optionally smoothed 308 to facilitate smooth control of images at the device. The filtering may be carried out using band pass filters or in other ways. The smoothing may be carried out using an averaging or other aggregation process or by fitting a smooth function to the sensor readings or in any other way. In FIG. 3 the filtering 306 and smoothing 308 operations are shown as being carried out separately of a browser 310. However, it is also possible for the browser 310 to carry out some or all of the filtering and smoothing.

The device comprises a web browser 310 arranged to enable web pages (such as landing page 324 of web service 320) to be retrieved from the internet, an intranet or any computing entity over a communications network. The web browser enables web pages comprising content such as images (and in some examples video) to be retrieved (downloaded) and rendered on a display 316 integral with or in communication with the device. For example, images and videos 326 may be stored at a database or other entity in communication with a web service 320. The web pages may comprise one or more templates 318. Each template comprises identifiers of one or more images (or video) to be displayed at the hand-held device. The identifiers may be addresses of the images/video or links for downloading the images/video from another entity. Each template also comprises one or more criteria for controlling the downloaded images on the basis of the sensor readings 304. The downloaded images 312 and video 314 may be stored at the hand-held device although that is not essential.

Figure 4:
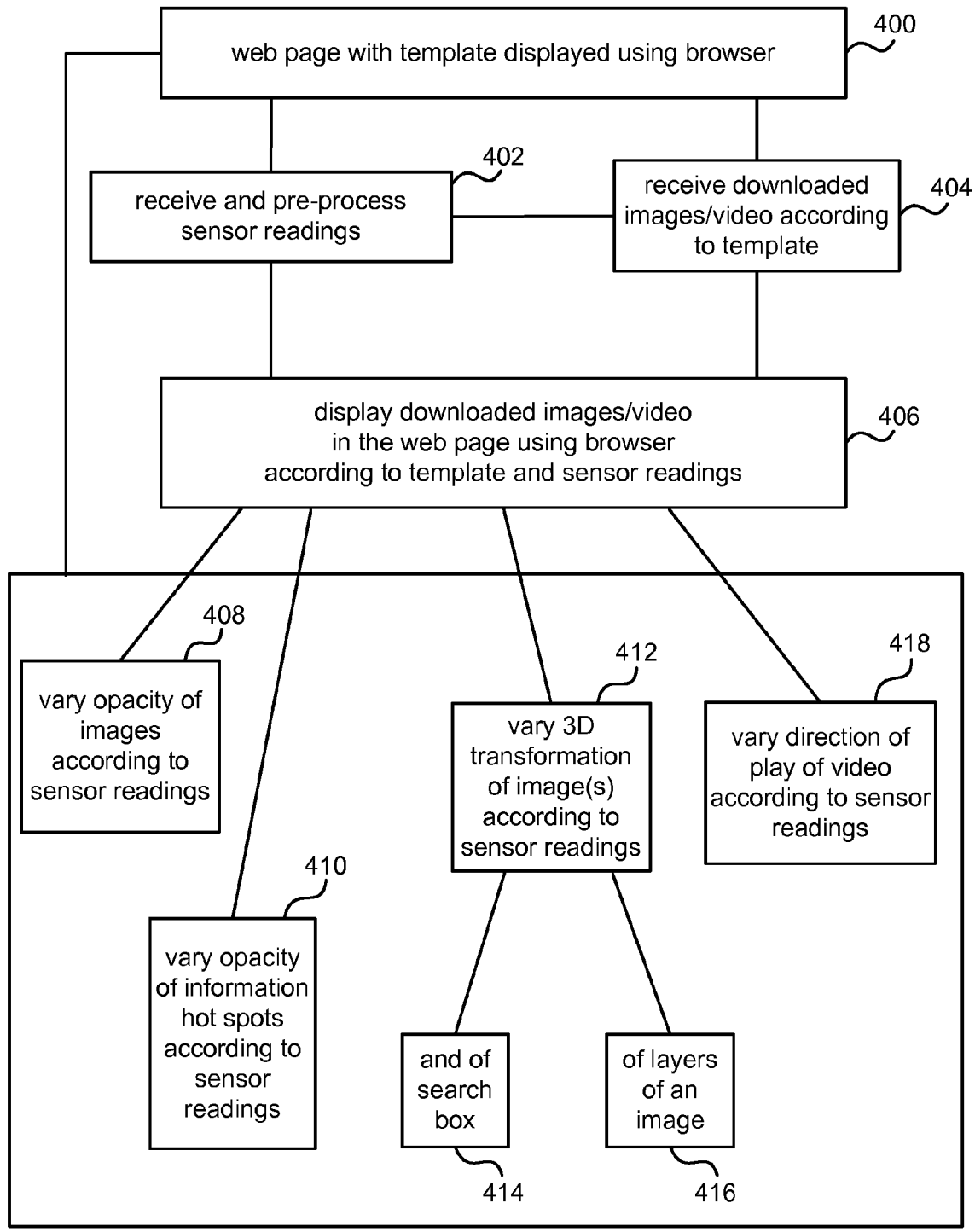
FIG. 4 is a flow diagram of methods of controlling images at a hand-held computing device.

FIG. 4 is a flow diagram of methods of controlling images at a hand-held computing device. A web page comprising a template is displayed 400 using a web browser at a hand-held computing device. The template may be as described above with reference to FIG. 3. Sensor readings are received 402 at the browser and these readings are optionally filtered and optionally smoothed as described above. The browser may carry out the filtering and/or smoothing.

The template comprises identifiers of one or more images and these images are accessed, for example, by downloading them using the browser. Thus the downloaded images are received 404 according to the template. The downloaded images are displayed 406 as part of the web page using the browser and according to the template and the sensor readings.

In various examples the template identifies two or more images which are display as part of the web page by being superimposed or layered over each other. The opacity of the images is varied 408 according to the sensor readings as specified in the template so that various different visual effects are achieved.

For example, two images may be superimposed with the second image placed over the first. The first image (bottom image) has a fixed opacity of 1 where 1 is opaque and 0 is transparent. The second image (top image) has a variable opacity according to an orientation of the hand-held computing device. For example, as a user gradually tilts a slate computer there is a gradual transition between the two images as the opacity of the second image becomes gradually more opaque. For example, the gradual transition may be used to create a cross-fade from a black and white image to a color image of the same scene. In another example, the cross-fade is between images of the same scene in different seasons of the year. In another example, the cross-fade is between images in a slide show. In another example, the images are of the same geographical location at different times in history.

In another example, two images are again superimposed with the second image placed over the first. The first image (bottom image) has a fixed opacity of 1 where 1 is opaque and 0 is transparent. The second image (top image) has a variable opacity. However, instead of varying the opacity in proportion to the orientation of the hand-held computing device, a specified amount of orientation change (or other sensor change) triggers a complete transition in opacity of the second image from 0 to 1. The orientation change triggers the cross-fade which continues until completion without waiting for additional notification from the sensors.

The examples described above in which opacity of images is varied according to the orientation of the device may be extended to situations where more than two images are used. For example, to implement a cross-fade between more than two images, a separate range of sensor values may be assigned in the template to each image. The template varies the opacity of each image when the sensor readings are within the range for that image.

In another example a mirrored cross-fade is implemented. The template specifies two or more images and causes each image except the last one to be duplicated in the structure of the web page. The images are superimposed and the opacity varied according to the orientation of the device. For example, in the case that two images are used (such as a tree in winter and the same tree in summer for example), one of those images is duplicated (say the tree in summer). When the device is horizontal the tree in winter may be displayed. When the device tilts left a cross-fade to the tree in summer may occur by varying the opacity as mentioned above. When the device tilts right a cross-fade to the tree in summer may also occur by varying the opacity according to the orientation.

In some examples a plurality of images are obtained from a video sequence. For example, the images may be sampled or selected from a video sequence (by taking every third image or every nth image). The images are superimposed and the opacity of the different images varied according to the orientation of the device as described above. In this way the visual effect of motion may be achieved. Where the images depict a symmetric motion sequence (one which is realistic when played forwards or backwards) the direction of transition between the images may be directly related to the direction of change of orientation of the device. In order that the images may be downloaded in practical time scales the images may be compressed and/or of reduced size or resolution.

In some examples the web page comprises a plurality of information hot spots that appear with cursor hover. An information hot spot is a region of a web page which changes in appearance when a user hovers a cursor over that region to indicate that if the user selects that region by clicking on it, information will be presented. The change in appearance acts as an indication to the user that information is available. The template may vary 410 opacity of information hotspots according to the sensor readings. For example, based on an accelerometer output a hotspot's opacity may be changed so that when the device's angle (both x and y at the same moment) are within a hotspot region then the opacity of the hotspot is 1 (opaque). When the angle is close enough the opacity is less than 1 so that the hotspot is partially transparent indicating to a user that further tilt of the device will fully reveal the hotspot.

In some examples the template is arranged to vary 412 a 3D transformation of one or more images according to the sensor readings. For example a visual effect of a floating search box may be achieved or of an object such as a butterfly floating over a field. The template specifies that at least two images are displayed as layers superimposed on one another in a 3D space. Tilting the device triggers a 3D transformation of the 3D space (such as rotation) based on the tilt angle. In some examples the a search box 414 is placed higher than a background image in the 3D space and a shadow is depicted on the surface of the background image as if the search box created the shadow.

In another example the images in the 3D space are layers 416 cropped from an original image and saved with transparency information. For example, an original image may be of a person standing in a city scene. A first cropped image may comprise the image of the person in the foreground. A second cropped image may comprise images of objects at a first distance range from the person (e.g. traffic immediately behind the person). A third cropped image may comprise images of buildings behind the traffic. A fourth cropped image may comprise images of the sky. The cropped images are placed into the 3D space, superimposed over the original image, and with different heights in the 3D space. Tilting the device triggers rotating the whole space, for example, in proportion to accelerometer values, causing a perspective effect.

In some examples the web browser comprises a viewer for 3D scenes comprising one or more 3D objects. In this case the template may be arranged to rotate the view of a 3D scene according to an orientation of the device.

In some examples a video is downloaded and displayed as part of the web page by playing the video in a direction (forward or backwards) according to an orientation of the device. That is, the template may vary 418 the direction of play of a video according to the sensor readings.

Figure 5:
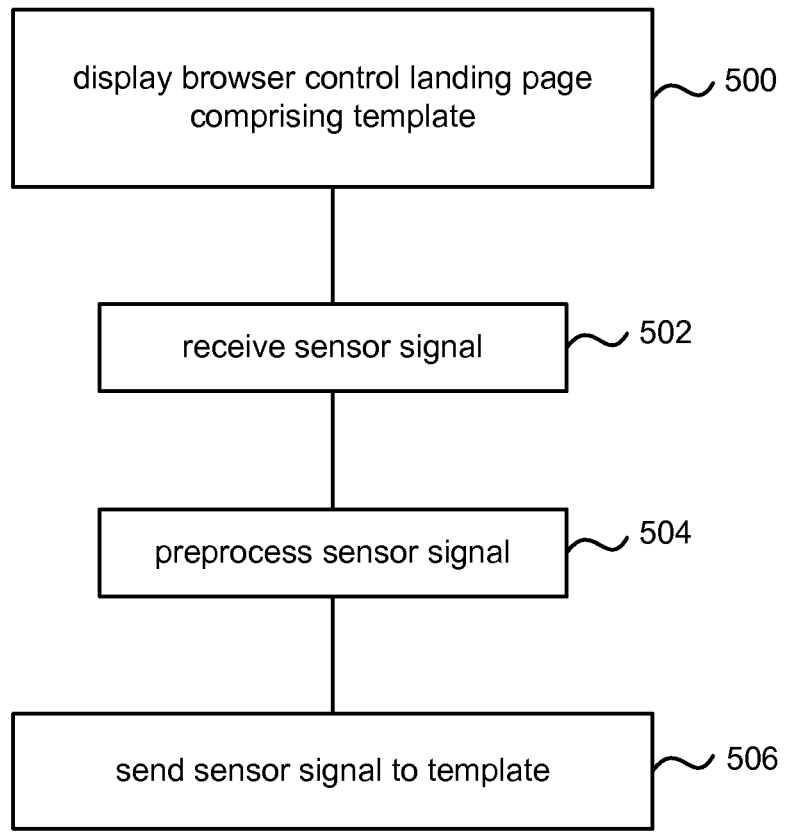
FIG. 5 is a flow diagram of a method at a web browser on a hand-held computing device.

FIG. 5 is an example of a method at a browser of a hand-held computing device. The browser displays 500 a browser control landing page comprising a template as described above. The browser receives 502 sensor signals from the hand-held computing device which may be used to determine an orientation of the device. The browser optionally pre-processes 504 the sensor signals such as by filtering and/or smoothing as described above. The browser sends 506 the sensor signals to the template in order that the template may control display of one or more images at the browser control landing page according to the sensor signals.

Figure 6:
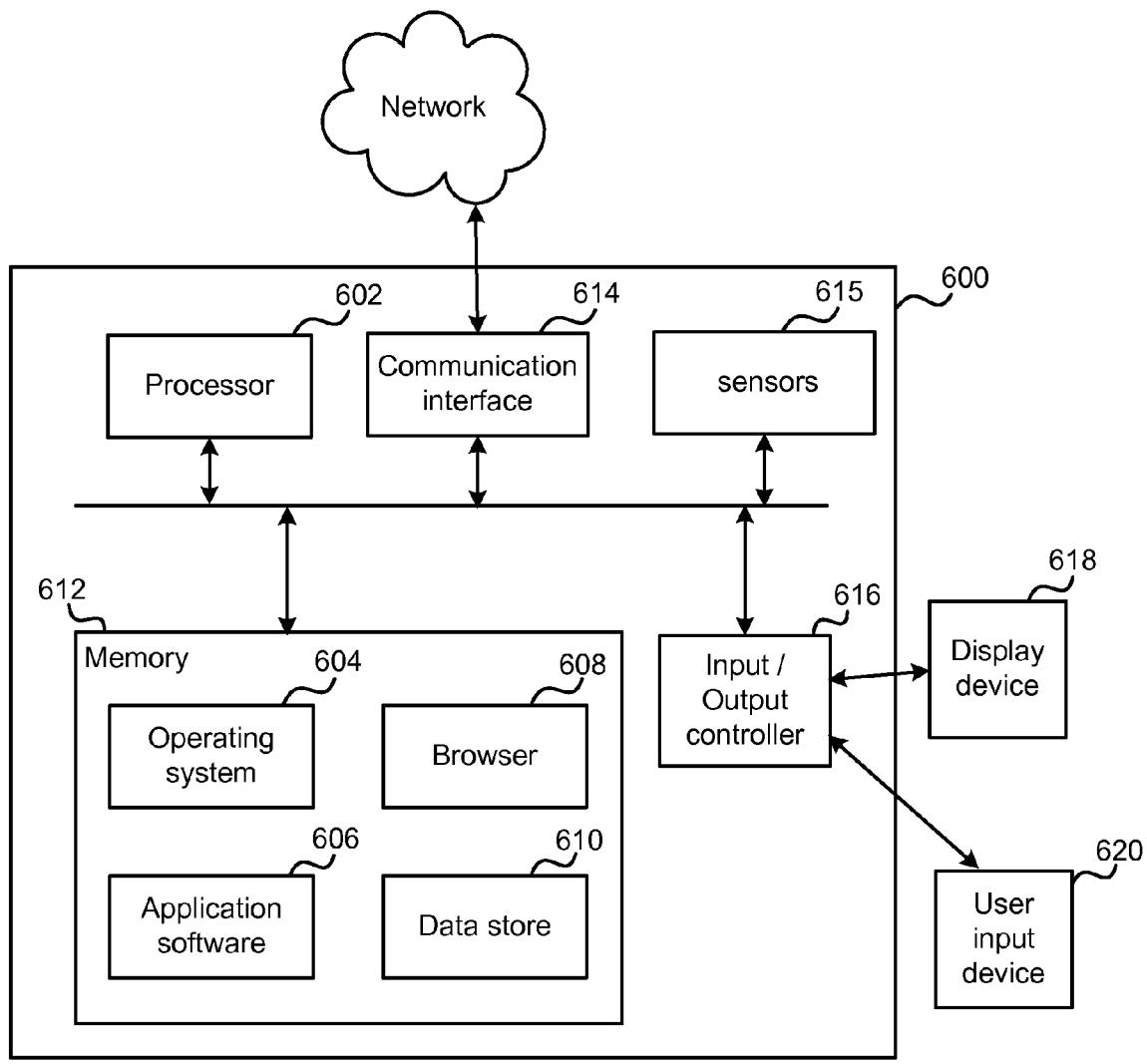
FIG. 6 illustrates an exemplary computing-based device in which embodiments of a hand-held computing device may be implemented.

FIG. 6 illustrates various components of an exemplary computing-based device 600 which may be implemented as any form of a computing and/or electronic device, and in which embodiments of a hand-held computing device may be implemented.

Computing-based device 600 comprises one or more processors 602 which may be microprocessors, controllers or any other suitable type of processors for processing computer executable instructions to control the operation of the device in order to implement a hand-held computing device which is able to control images using orientation signals from the device. In some examples, for example where a system on a chip architecture is used, the processors 602 may include one or more fixed function blocks (also referred to as accelerators) which implement a part of the method of controlling images using sensors in hardware (rather than software or firmware). Platform software comprising an operating system 604 or any other suitable platform software may be provided at the computing-based device to enable application software 606 to be executed on the device. Browser 608 software is provided at the computing-based device to enable web pages to be downloaded and displayed at the device using display device 618. A data store 610 is available to enable content such as images, videos and other media to be stored for presentation on web pages in the browser 608 and for storing criteria, rules, sensor readings and other data.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. A propagating signal per se may be present within a computer storage media, but a propagating signal per se is not an example of a computer storage media. Although the computer storage media (memory 612) is shown within the computing-based device 600 it will be appreciated that the storage may be distributed or located remotely and accessed via a network or other communication link (e.g. using communication interface 614).

The computing-based device 600 comprises one or more sensors 615 and a non-exhaustive list of examples is: accelerometer, compass, gyroscope, camera, microphone, magnetometer, pressure sensor, light sensor, GPS.

The computing-based device 600 also comprises an input/output controller 616 arranged to output display information to a display device 618 which may be separate from or integral to the computing-based device 600. The display information may provide a graphical user interface and/or audio output or other types of display output. The input/output controller 616 is also arranged to receive and process input from one or more devices, such as a user input device 620 (e.g. a mouse, keyboard, camera, microphone or other sensor). In some examples the user input device 620 may detect voice input, user gestures or other user actions and may provide a natural user interface. This user input may be used to browse web pages, interact with advertisements displayed at the display device 618 or for other purposes. In an embodiment the display device 618 may also act as the user input device 620 if it is a touch sensitive display device. The input/output controller 616 may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, hand-held telephones (including smart phones), tablet computers, slate computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling at least one image at a hand-held computing device comprising:
    displaying a web page at the hand-held computing device, the web page having a template for displaying at least two images by layering the images;
    downloading the at least two images;
    receiving readings from at least one sensor integral with the device;
    displaying the at least two images at the web page according to the readings, according to criteria in the template and before user input is received at the displayed image; and
    any of:
        varying opacity of at least one of the images according to the sensor readings as specified in the template, the images being from a video sequence depicting a symmetric motion sequence which appears realistic when played forwards or backwards such that in use, when the opacity of the images is varied the visual effect of motion is achieved; or
        displaying the images as layers superimposed on one another in a 3D space and transforming the 3D space according to the sensor readings wherein the images in the 3D space are layers cropped from an original image and saved with transparency information, the method further comprising rotating the 3D space according to the sensor readings causing a perspective effect.

2. A method as claimed in claim 1, wherein the template identifies two or more images, further comprising:
    varying opacity of at least one of the images according to the sensor readings as specified in the template.

3. A method as claimed in claim 1, wherein the template identifies a first and a second image, further comprising:
    displaying the images as part of the web page by placing the second image over the first;
    displaying the first image as opaque; and
    varying opacity of the second image according to an orientation of the hand-held computing device such that, in use, as a user gradually tilts the device there is a gradual transition between the two images as the opacity of the second image becomes gradually more opaque.

4. A method as claimed in claim 3 comprising varying the opacity of the second image either in proportion to the orientation of the device or by triggering a complete transition in opacity from transparent to opaque once a specified orientation change is detected.

5. A method as claimed in claim 2 wherein the template comprises a range of sensor readings for each image and the method comprises using the template to vary the opacity of each image when the sensor readings are within the range specified in the template for the image.

6. A method as claimed in claim 2 wherein the template causes each image except one to be duplicated in the structure of the web page.

7. A method as claimed in claim 2 wherein the images are from a video sequence depicting a symmetric motion sequence which appears realistic when played forwards or backwards such that in use, when the opacity of the images is varied the visual effect of motion is achieved.

8. A method as claimed in claim 1 wherein the web page comprises one or more hot spots each being a region of a web page which changes in appearance when a user selects the region to indicate that information is available associated with that region; and wherein the method comprises varying opacity of the hot spots according to the sensor readings.

9. A method as claimed in claim 1 comprising displaying the images as layers superimposed on one another in a 3D space and wherein the method comprises transforming the 3D space according to the sensor readings.

10. A method as claimed in claim 9, wherein the images in the 3D space are layers cropped from an original image and saved with transparency information, the method further comprising rotating the 3D space according to the sensor readings causing a perspective effect.

11. A method as claimed in claim 1 wherein the web page is displayed using a web browser comprising a viewer for 3D scenes comprising one or more 3D objects; and wherein the method comprises using the template to operate the viewer to rotate the view of a 3D scene according to an orientation of the device.

12. A method as claimed in claim 1 wherein the first image is a video and the method comprises using the template to play the video either forwards or backwards according to the sensor readings.

13. A method as claimed in claim 1 comprising filtering and smoothing the sensor readings before using them to control display of the images.

14. A method of controlling at least one image at a hand-held computing device comprising:
   displaying a web page at the hand-held computing device, the web page having a template identifying a plurality of images;
   downloading the images;
   receiving readings from at least one orientation sensor integral with the device;
   displaying the images at the web page by layering the images and varying opacity of at least one of the images according to the orientation sensor readings, according to criteria in the template and before user input is received at the displayed image; and
   any of:
      varying opacity of at least one of the images according to the sensor readings as specified in the template, the images being from a video sequence depicting a symmetric motion sequence which appears realistic when played forwards or backwards such that in use, when the opacity of the images is varied the visual effect of motion is achieved; or
      displaying the images as layers superimposed on one another in a 3D space and transforming the 3D space according to the sensor readings wherein the images in the 3D space are layers cropped from an original image and saved with transparency information, the method further comprising rotating the 3D space according to the sensor readings causing a perspective effect.

15. A method as claimed in claim 14, wherein the template identifies a first and a second image and displaying the images at the web page comprises:
   placing the second image over the first;
   displaying the first image as opaque; and
   varying opacity of the second image either in proportion to the orientation of the device or by triggering a complete transition in opacity from transparent to opaque once a specified orientation change is detected.

16. A method as claimed in claim 14 wherein the template comprises a range of sensor readings for each image and the method comprises using the template to vary the opacity of each image when the sensor readings are within the range specified in the template for the image.

17. A method as claimed in claim 14 wherein the images are from a video sequence depicting a symmetric motion sequence which appears realistic when played forwards or backwards such that in use, when the opacity of the images is varied the visual effect of motion is achieved.

18. A hand-held computing device comprising:
   a processor having a web browser arranged to display a web page at the hand-held computing device, the web page having a template for displaying at least two images by layering the images;
   at least one sensor integral with the device; and
   a display screen, the processor being arranged to display and vary the opacity of the at least two images at the web page on the display screen according to the readings from the at least one sensor, according to criteria in the template and before user input is received at the displayed image; and
   the web browser being further arranged to perform any of:
      varying opacity of at least one of the images according to the sensor readings as specified in the template, the images being from a video sequence depicting a symmetric motion sequence which appears realistic when played forwards or backwards such that in use, when the opacity of the images is varied the visual effect of motion is achieved; or
      displaying the images as layers superimposed on one another in a 3D space and transforming the 3D space according to the sensor readings wherein the images in the 3D space are layers cropped from an original image and saved with transparency information, the method further comprising rotating the 3D space according to the sensor readings causing a perspective effect.

19. A hand-held computing device as claimed in claim 18 the processor being arranged to vary opacity of at least one of the images either in proportion to the orientation of the device or by triggering a complete transition in opacity from transparent to opaque once a specified orientation change is detected.

20. A hand-held computing device as claimed in claim 18 the processor being arranged to control one or more hot spots each being a region of a web page which changes in appearance when a user selects the region to indicate that information is available associated with that region; and wherein the method comprises varying opacity of the hot spots according to the sensor readings.

* * * * *